United States Patent [19]

Horwill et al.

[11] Patent Number: 4,962,959
[45] Date of Patent: Oct. 16, 1990

[54] REAR WINDOW SUNVISOR

[75] Inventors: Rodney E. Horwill, Brookfield; Gregory M. Horwill, Kenmore, both of Australia

[73] Assignee: Cyclamen Services Proprietary, Ltd., Salisbury, Australia

[21] Appl. No.: 463,229
[22] Filed: Jan. 11, 1990
[51] Int. Cl.⁵ .............................................. B60J 3/00
[52] U.S. Cl. ................................... 296/95.1; D12/191
[58] Field of Search ................... 296/95.1, 91, 152; 49/62; D12/191

[56] References Cited

U.S. PATENT DOCUMENTS

| | | | |
|---|---|---|---|
| D. 85,241 | 9/1931 | Henderson | D12/191 |
| D. 85,981 | 1/1932 | Henderson | D12/191 |
| D. 159,813 | 8/1950 | Karton | D12/191 |
| D. 175,324 | 8/1956 | Sullivan | D12/191 |
| D. 245,689 | 9/1977 | Simpson | D12/191 |
| D. 250,527 | 12/1978 | Sacco et al. | D12/191 |
| D. 271,191 | 11/1983 | Amprim et al. | D12/191 |
| D. 273,671 | 5/1984 | Ford | D12/191 |
| D. 277,273 | 1/1985 | Schmidt | D12/191 |
| D. 283,611 | 4/1986 | Kingsley | D12/191 |
| D. 286,143 | 10/1986 | Lund | D12/191 |
| D. 299,713 | 2/1989 | Dunham | D12/191 |
| D. 301,028 | 5/1989 | Buck | D12/191 |
| D. 301,450 | 6/1989 | Kingsley | D12/191 |
| D. 303,329 | 9/1989 | Gempel et al. | D12/191 |
| D. 303,948 | 10/1989 | Bonstead et al. | D12/191 |
| 2,264,014 | 11/1941 | Wohlfield | 296/95.1 |
| 2,318,143 | 5/1943 | Cutting | 296/95.1 |
| 2,389,002 | 11/1945 | Schatzman et al. | 296/95.1 |
| 2,738,221 | 3/1956 | Zwaska | 296/95.1 |
| 2,797,961 | 7/1957 | McKay | 296/95.1 |
| 4,006,933 | 2/1977 | Simpson | 296/95.1 |
| 4,412,698 | 11/1983 | Kingsley | 296/95.1 |
| 4,453,762 | 6/1984 | Deaver | 296/95.1 |
| 4,469,366 | 9/1984 | Deaver | 296/95.1 |
| 4,652,038 | 3/1987 | Aunger | 296/95.1 |
| 4,685,717 | 8/1987 | Gaston | 296/95.1 |
| 4,715,643 | 12/1987 | Butler | 296/152 |
| 4,758,040 | 7/1988 | Kingsley et al. | 296/95.1 |
| 4,842,320 | 6/1989 | Kingsley | 296/95.1 |

FOREIGN PATENT DOCUMENTS 8005056 4/1982 Netherlands .
794922 5/1956 United Kingdom .

Primary Examiner—Robert R. Song
Attorney, Agent, or Firm—Finnegan, Henderson, Farabow, Garrett & Dunner

[57] ABSTRACT

A rear window sunvisor includes a partially transparent or opaque body member with integrally formed, depending tapered side support members which space the body member trailing edge from the window. A continuous flange formed along the body member leading edge and side member leading edges includes an adhesive strip for mounting the visor directly to the window with no alterations to the frame. Apertures can be formed in the body member and/or side members to direct air flow against the rear window to reduce dirt build-up.

16 Claims, 2 Drawing Sheets

REAR WINDOW SUNVISOR

BACKGROUND OF THE INVENTION

The invention relates to improvements to vehicle accessories and in particular to an improved rear window, sunvisor for vehicles.

Many different devices have been proposed and used in the past for reducing or eliminating passage of the sun's rays into the vehicle. Such devices have been associated with the front or rear window of a vehicle and can be either located internally or externally of the vehicle. The devices employed for the rear window of the vehicle are often in the form of an internal or external multibladed louvre which suffer the disadvantage of reducing visibility through the rear window. Furthermore, the external structures generally reduce the aerodynamic characteristics of the vehicle so that fuel consumption is increased. The external structure also can require alteration to the window or frame for installation. A further disadvantage associated with prior art sunscreens is that the wind turbulence can create noise which may be intrusive to occupants of the vehicle.

The present invention aims to overcome or alleviate the above disadvantages by providing an improved visor for vehicles which is adapted to be associated with the rear window, of a vehicle to provide shade to the vehicle interior. The present invention also aims to provide a visor which blends aerodynamically into the shape of the vehicle and which may be simply mounted to the vehicle rear window without drilling or other alteration to the window frame. Other objects and advantages of the invention will be become apparent hereunder.

SUMMARY OF THE INVENTION

With the above and other objects in view, the present invention provides a visor adapted to be mounted to the rear window of a motor vehicle adjacent the upper edge thereof, the visor including an elongated body portion adapted in use to extend transversely of the vehicle, the elongated body portion being adapted to be secured along or adjacent its leading longitudinal edge thereof to the window and be spaced from the window at its trailing longitudinal edge so that the driver's view through the rear window is substantially unobstructed.

Preferably, the elongated body portion terminates at its opposite transverse ends in a pair of downwardly depending, integrally formed side portions, the side portions tapering in width from the trailing edge towards the leading edge of the body portion. Means are provided for securing the leading edge of the body portion and the leading edges of the side portions to the rear window so that the trailing edge of the body portion is spaced from the rear window.

Preferably the taper of the side portions is such that the body portion of the visor comprises a substantially coplanar extension of the portion of the roof of the vehicle terminating at the rear window so that aerodynamic characteristics of the vehicle are at least substantially maintained. Also, the body portion transverse ends and associated side portions may be configured to comprise planar extensions of the respective adjacent vehicle side panels, for the same reason.

The body portion at its leading edge and the side portions ar their leading edges are provided with a continuous flange which is adapted to be juxtaposed with the rear window, preferably adjacent the surrounding peripheral seal thereof and the flange is adhered to the window so as to secure the visor to the vehicle. Preferably, the flange is provided with a double sided adhesive tape for this purpose. Of course the flange may be provided with an adhesive applied directly thereto and covered with a strippable covering which may be stripped to expose the adhesive.

Preferably the visor is formed of a partially transparent or opaque material such as tinted acrylic or other plastics material.

BRIEF DESCRIPTION OF THE DRAWING

In order that the invention may be more readily understood and put into practical effect, reference will now be made to the accompanying drawings which illustrate preferred embodiments of the invention and wherein.

DESCRIPTION OF THE PREFERRED EMBODIMENTS

Figure 1:
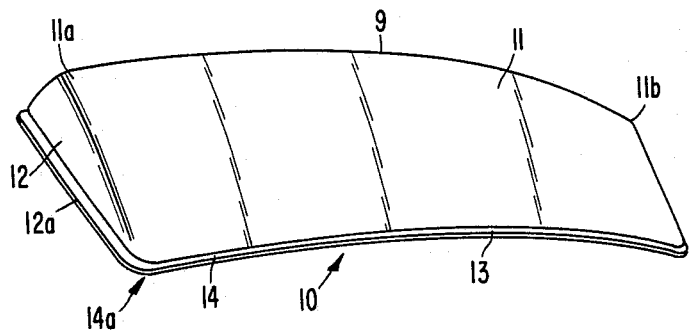
FIG. 1 is a perspective view of one form of visor according to the invention.
Figure 2:
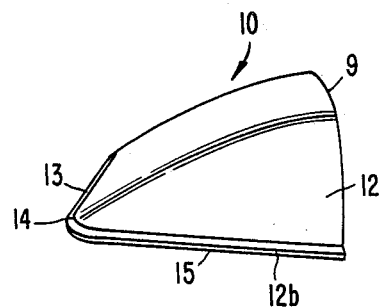
FIG. 2 is a side view of the visor of FIG. 1.

Referring to the drawings and firstly to FIGS. 1 and 2, there is illustrated a visor 10 according to the present invention. In accordance with the present invention, the visor includes a body member having a leading edge for positioning against the upper portion of the window, a trailing edge, and a pair of opposed transverse ends. As embodied herein, visor 10 comprises a main, longitudinally continuous, transversely elongated body member portion 11 which is configured to follow in a general sense the curve of the rear window of a vehicle to which the visor 10 is to be applied. The body portion 11 has a leading longitudinal edge 13, trailing longitudinal edge 9, and opposed transverse ends 11a, 11b.

Also in accordance with the present invention, the visor includes depending support means connected to the body member transverse ends for spacing the trailing edge from the window. As embodied herein, body portion 11 terminates at its opposite transverse ends 11a, 11b in a pair of integrally formed side member portions 12 which taper in width as shown so that the width at the trailing edge 9 of the body portion 11 is greater than that at the leading edge 13. This provides the spacing of the trailing edge 9 and results in a largely unobstructed view through the window from the position of the driver. The side portions 12 may also be inclined inwardly to follow generally the external configuration of the adjacent body panels of the vehicle.

Further in accordance with the present invention, the visor includes means for mounting directly to the window. As embodied herein, extending about the leading edge of the body portion 11 and the leading edges 12a, 12b of the side portions 12 is a continuous flange 14 having a flange surface 14a which is adapted to be juxtaposed with the surface of the window panel to which the visor is to be applied, the flange 14 substantially following the profile of the perimeter edge of the window panel as described below. The flange 14 is also provided on its underside with adhesive means such as a double-sided adhesive tape 15 to facilitate mounting of the visor 10 to the window panel. The tape 15 may either be provided in discrete lengths or be continuous along the flange 14. A presently preferred tape material has a foam carrier with an acrylic adhesive and is supplied by the 3M Company under product Nos. Y4210 and Y4225.

This mounting arrangement has the advantage that the flange surface along the leading edge of the body portion 11 and/or the leading edges 12a, 12b of the side portions 12 may be substantially sealably connected to the window by the use of adhesive extending continuously across the width of the window. As a result, noise production by wind passing through a slot between the visor and the window is eliminated. Alternatively, if discrete lengths of adhesive are spaced along the flange, the edge of the visor adjacent the screen is sufficiently rigidified and/or sufficiently close to the window as to minimize air turbulence about that edge of the visor and consequent noise production.

Furthermore, when used as a visor on a rear window, and of course visors according to this invention can be applied to a front windscreen, a sealable connection between the leading edge of the body portion 11 and the rear window will maintain the upper portion of the window dry and will minimize distortion of vision through a soiled window due to passage of water there across. Additionally, a sealed connection between the leading edge of the body portion 11 and a front or rear window will shield the upper portion of the window from cold air flow while the vehicle is parked and will alleviate frosting of the upper portion thereof and assist with vision through the window.

Figure 3:
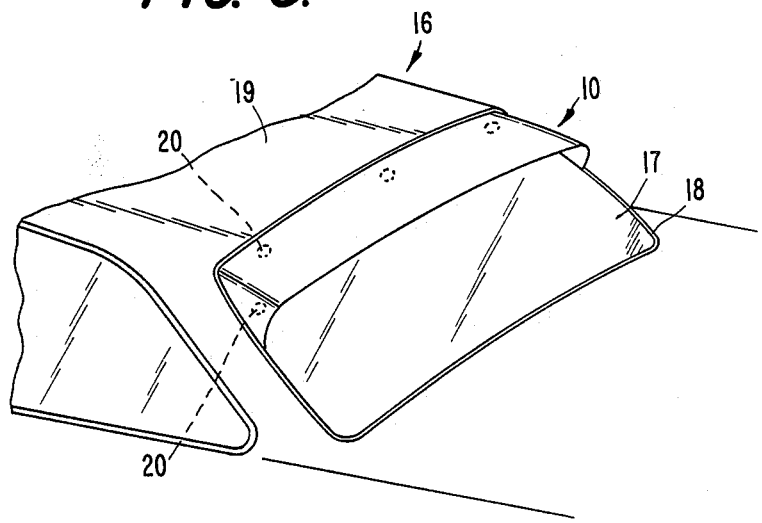
FIG. 3 is a perspective view illustrating the visor of FIG. 1 as applied to the rear window of a vehicle.
Figure 4:
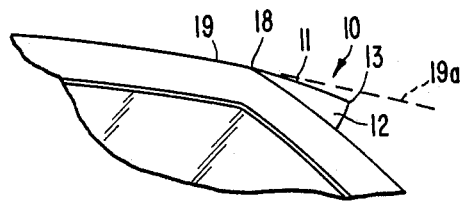
FIG. 4 is a partial side view of the vehicle and associated visor as in FIG. 1.

Referring now to FIGS. 3 and 4, there is illustrated a portion of a vehicle 16 having a rear window 17 surrounded as is conventional by sealing strip 18 of rubber or the like and held in a frame. Fitted to the rear window 17 is the visor 10 of the invention with the flange 14 thereof being located at the upper and side portions of the rear window 17 and disposed adjacent the sealing strip 18. As stated above, the flange 14 is provided with a double-sided adhesive tape 15 and, for fitting the visor 10 in position, it is a simple matter to remove the protective covering over the tape, position the visor at the upper portion of the window 17 and press the visor 10 onto the window 17 so that the tape 15 adheres thereto. For added safety, a secondary mechanical fixing system may be added.

As shown more clearly in FIG. 4, the taper of the visor side portions 12 is preferably such that the visor body portion 11 comprises a substantially continuous extension of the roof portion 19 adjacent the rear window 17, with trailing edge 13 lying substantially proximate the plane 19a defined by the projection of roof portion 19 (see FIG. 4). This ensures that a streamlined flow of air over the vehicle roof is uninterrupted by the visor 10.

The visor 10 is preferably formed of a dark tinted acrylic, acrylic copolymer, or polycarbonate material so as to reduce glare and heat transmission into the vehicle from the sun's rays. For use in high temperature climates, an acrylic-imide copolymer such as sold under the name KAMAX by Rohm & Haas may be preferred.

Still further in accordance with the present invention, the visor can include means to reduce dirt and grime build-up on the rear window 17. If required, the side portions 12 and/or the body portion 11 may be apertured, as is depicted schematically by apertures 20 shown in dotted lines in FIG. 3, to improve the flow of air over the rear window and thus prevent or facilitate the removal of dust and other dirt build-up.

Figure 5:
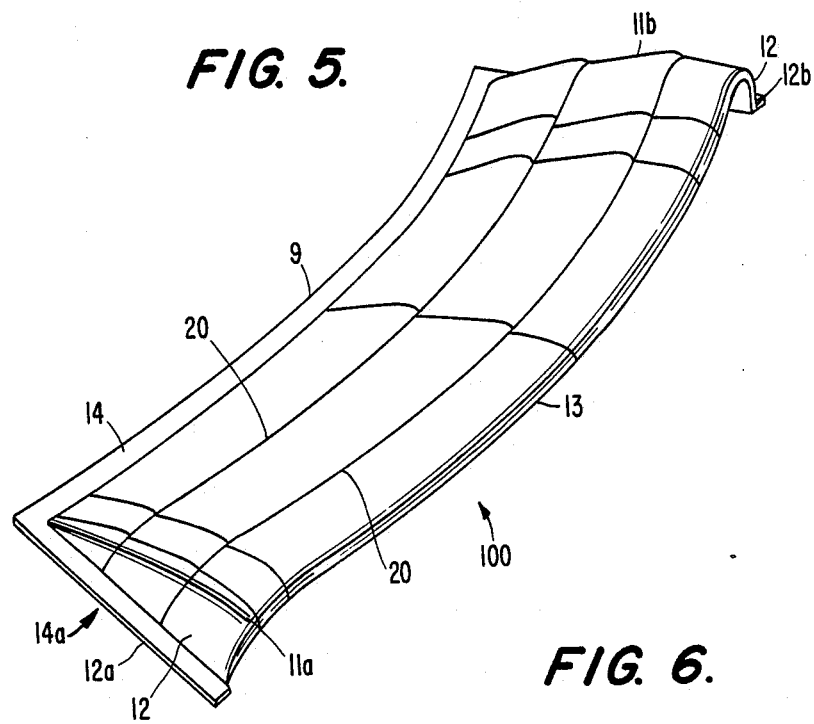
FIG. 5 is a perspective view of another form of visor according to the invention.
Figure 6:
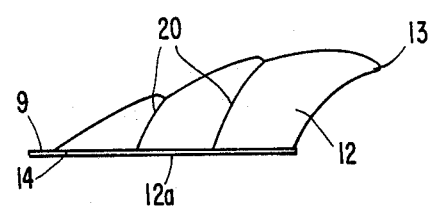
FIG. 6 is a side view of the visor of FIG. 5.

A further preferred embodiment designated generally by the numeral 100 is shown in FIGS. 5 and 6 with like features numbered in accordance with the previously discussed embodiment shown in FIGS. 1-4. In accordance with another aspect of the present invention, the visor includes means for suppressing vibration of the trailing edge during operation of the vehicle. As embodied herein and depicted in FIGS. 5 and 6, visor 100 includes transverse ribs 20 integrally formed with body member 11 and side members 12, and extending between side member leading edges 12a and 12b. Although two such transverse ribs 20 are shown in the Figures, one rib or more than two ribs may be used to stiffen body member 11 transversely and thus suppress wind or road induced flexing and vibration of spaced trailing edge 13.

The present invention thus provides a simple and effective means for reducing the heat build-up and glare in a vehicle whilst not detracting from the aesthetic appeal of the vehicle nor affecting substantially the aerodynamic shape of the vehicle or the view out of the rear window or interferring with the operation of rear window wipers. The longitudinal shape of the visor 10 may be substantially varied to suit different vehicles and, similarly the width of the visor may be varied as desired.

Whilst the above has been given by way of an illustrative embodiment of the invention, all such variations and modifications thereto as would be apparent to persons skilled in the art are deemed to fall within the broad scope and ambit of the invention as herein set forth.

What is claimed is:

1. A visor for mounting on the rear window of a vehicle, the window having an upper portion and opposed side portions, the visor comprising:

a body member having a first leading edge for positioning against the window at the upper portion thereof, a trailing edge spaced from said leading edge, and a pair of opposed transverse ends, said body member being transversely elongated to span substantially the rear window between the opposed side portions;

depending support means connected to said body member transverse ends for spacing said trailing edge from said window; and means associated with said body member and said support means for mounting the visor directly to the window, wherein the projection of the vehicle roof portion adjacent the upper window portion defines a plane, and wherein said spaced trailing edge lies in a second plane substantially coplanar with the defined plane, wherein said depending support means includes a pair of side members having respective second and third leading edges for positioning against the window, wherein said mounting means includes said body member and said side members each having flange portions disposed along said first, second, and third leading edges, respectively, said flange portions having respective flange surfaces configured to seat on the window, and wherein said mounting means further includes adhesive strip means positioned along said respective flange surfaces.

2. A visor for mounting on the rear window of a vehicle, the window having an upper portion and opposed side portions, the visor comprising:
a body member having a first leading edge for positioning against the window at the upper portion thereof, a trailing edge spaced from said leading edge, and a pair of opposed transverse ends, said body member being transversely elongated to span substantially the rear window between the opposed side portions;
depending support means connected to said body member transverse ends for spacing said trailing edge from said window; and
means associated with said body member and said support means for mounting the visor directly to the window,
wherein the projection of the vehicle roof portion adjacent the upper window portion defines a plane, and wherein said spaced trailing edge lies in a second plane substantially coplanar with the defined plane,
the visor further including means for directing air flow against the window to reduce dirt build-up.

3. The visor as in claim 2 wherein said air-directing means includes aperture means formed in said body member.

4. The visor as in claim 2 wherein said depending support means includes a pair of side members, and wherein said air-directing means includes aperture means formed in said side members.

5. A visor for mounting on the rear window of a vehicle, the window having an upper portion and opposed side portions, the visor comprising:
a body member having a first leading edge for positioning against the window at the upper portion thereof, a trailing edge spaced from said leading edge, and a pair of opposed transverse ends, said body member being transversely elongated to span substantially the rear window between the opposed side portions;
depending support means connected to said body member transverse ends for spacing said trailing edge from said window; and
means associated with said body member and said support means for mounting the visor directly to the window,
wherein the projection of the vehicle roof portion adjacent the upper window portion defines a plane, and wherein said spaced trailing edge lies in a second plane substantially coplanar with the defined plane,
the visor further including means associated with said body member and said support means for suppressing vibrations of said trailing edge,
wherein said vibration suppressing means includes one or more transverse ribs connected to said body member and extending between said depending support means.

6. A visor for mounting on the rear window of a vehicle, the window having an upper portion and opposed side portions, the visor comprising:
a body member having a first leading edge for positioning against the window at the upper portion thereof, a trailing edge spaced from said leading edge, and a pair of opposed transverse ends, said body member being transversely elongated to span substantially the rear window between the opposed side portions;
depending support means connected to said body member transverse ends for spacing said trailing edge from said window; and
means associated with said body member and said support means for mounting the visor directly to the window,
wherein the projection of the vehicle roof portion adjacent the upper window portion defines a plane, and wherein said spaced trailing edge lies in a second plane substantially coplanar with the defined plane,
wherein said depending support means includes a pair of side members having respective second and third leading edges for positioning against the window,
the visor further including vibration suppression means comprising transverse rib means connected to said body member and side members and extending between said second and third leading edges.

7. The visor as in claim 6 wherein said body member and said side members are integrally formed, and wherein said transverse rib means include one or more integrally formed transverse ribs.

8. A visor for mounting on the rear window of a vehicle, the window having an upper portion and opposed side portions, the visor comprising:
a body member having a first leading edge for positioning against the window at the upper portion thereof, a trailing edge spaced from said leading edge, and a pair of opposed transverse ends, said body member being transversely elongated to span substantially the window between the opposed side portions;
a pair of depending side support members integrally formed at said body member transverse ends, said depending side support members having respective second and third leading edges for positioning against the window for spacing said trailing edge from said window and;
wherein said body member and said side members each have flange portions disposed along said first, second, and third leading edges, respectively, said flange portions having respective flange surfaces configured to seat on the window, and
wherein adhesive strip means are positioned along said respective surfaces, for mounting the visor directly to the window.

9. The visor as in claim 8 wherein the projection of the vehicle roof portion adjacent the upper window portion defines a plane, and wherein said spaced trailing edge lies in a second plane substantially coplanar with the defined plane.

10. The visor as in claim 8 wherein said body member and said side members are partially transparent.

11. The visor as in claim 8 wherein said flange portions and said flange surfaces are lengthwise continuous.

12. A visor for mounting on the rear window of a vehicle, said visor comprising:
a body member having a first abutting edge for positioning against the window at the upper portion thereof, an outer edge spaced from said abutting edge and a pair of opposed transverse ends, said body member being transversely elongated to substantially span the rear window;

depending support means connected to said transverse ends for spacing said outer edge from the window; and securing means for sealably securing said abutting edge to the window.

13. The visor as in claim 1 wherein said body member and said side members are partially transparent or opaque.

14. The visor as in claim 2 wherein said body member is partially transparent or opaque.

15. The visor as in claim 5 wherein said body member is partially transparent or opaque.

16. The visor as in claim 6 wherein said body member and said side members are partially transparent or opaque.

* * * * *

UNITED STATES PATENT AND TRADEMARK OFFICE
CERTIFICATE OF CORRECTION

PATENT NO. :  4,962,959

DATED :  October 16, 1990

INVENTOR(S) :  Rodney E. Horwill et al.

It is certified that error appears in the above-identified patent and that said Letters Patent is hereby corrected as shown below:

On the title page [22] Filed: Jan. 11, 1990, insert:

--Foreign Application Priority Data
January 13, 1989 Australia PJ2255--.

Signed and Sealed this

Nineteenth Day of May, 1992

Attest:

DOUGLAS B. COMER

Attesting Officer

Acting Commissioner of Patents and Trademarks